Dec. 28, 1937.   F. A. NODINE   2,103,634
THERMOMETER
Filed July 2, 1937
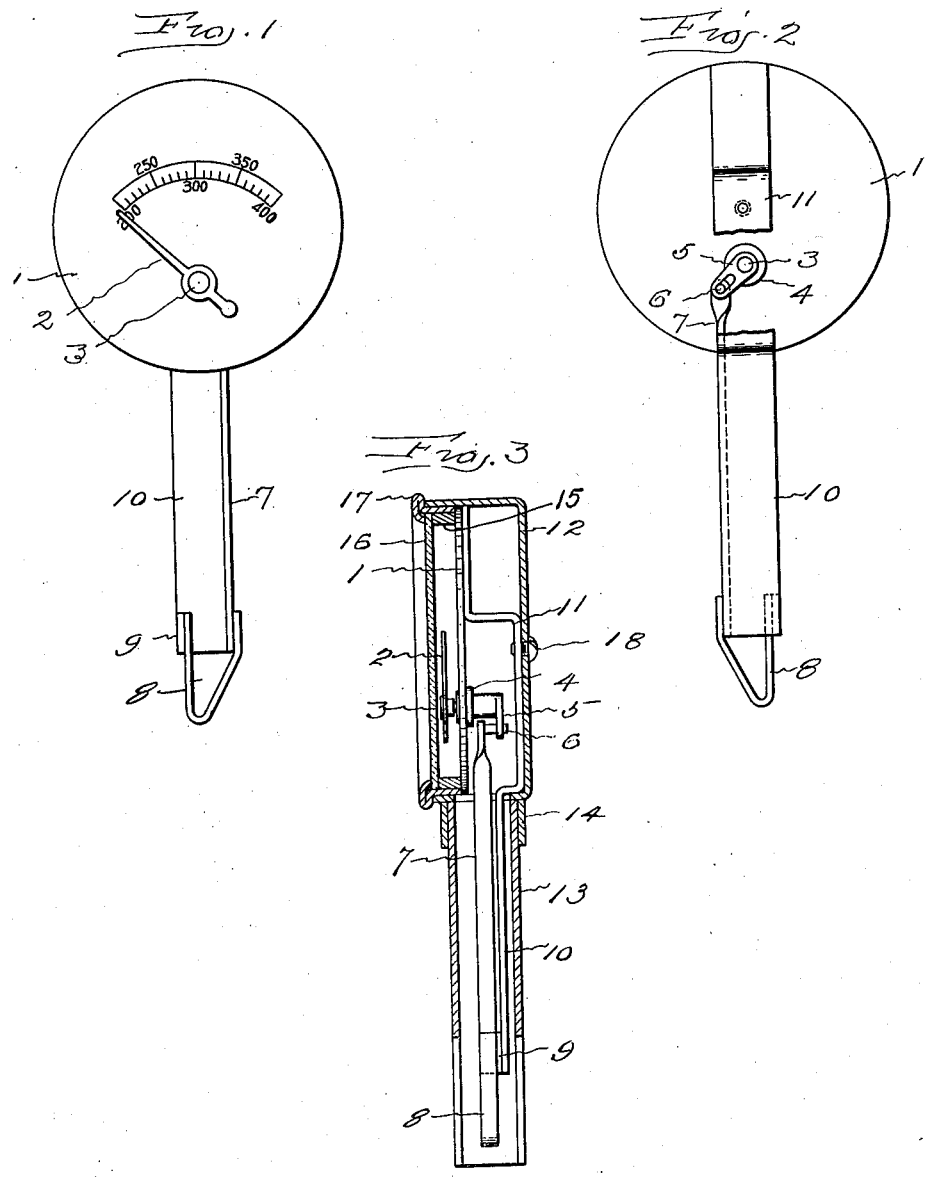
INVENTOR
Frederick A. Nodine
by Harry P. Williams
atty.

Patented Dec. 28, 1937

2,103,634

UNITED STATES PATENT OFFICE 2,103,634

THERMOMETER

Frederick A. Nodine, Terryville, Conn., assignor to The Cooper Oven Thermometer Company, Pequabuck, Conn., a corporation of Connecticut Application July 2, 1937, Serial No. 151,592

5 Claims. (Cl. 73—365)

This invention relates to the construction of thermometers that are particularly designed for indicating the temperature of liquids.

In the culinary art in order to obtain the best results, it is desirable to at all times be able to know the temperature of the hot liquids, especially oleaginous liquids, in which substances are being cooked. In the industrial field it is requisite to know the temperatures of heated liquids,— acidulated or saline, in which articles are to be treated. It has been common practice for ascertaining such temperatures to employ mercury or spirit thermometers, which are inconvenient to read and are easily broken, or to use mechanical thermometers which are of considerable size and occupy an undue amount of the available space in the vessels containing the liquids.

The object of the present invention is to provide for culinary and industrial uses a simple, inexpensive and rugged mechanical thermometer of comparatively small size and capable of use in shallow vessels, which is dependable, accurate, very sensitive to slight changes of temperature and can be read without close inspection.

This object is attained by so shaping, supporting and connecting a thermo-responsive strip and the temperature indicating means, that a unitary structure is produced which can be readily inserted in a suitable casing.

Fig. 1 of the accompanying drawing is a front view of an active unit that embodies the invention.

Fig. 2 is a back view of the active unit.

Fig. 3 is an edge view of the active unit in a casing which is shown in section.

The active unit has a dial 1 with the usual temperature indicia, and a pointer 2 that is movable over the face of the dial and that is attached to an arbor 3 which extends through and is rotatably supported by a bushing 4 secured to the dial. Attached to the rear end of the pointer arbor is a slotted arm 5 and a pin 6 extends from the upper end of a finger 7 into the slot in the arm. The lower end of this finger is fastened to an end of a short U-shaped ribbon 8 of thermoresponsive metal. The other end of the thermoresponsive ribbon is fastened to a lug 9 turned up from the lower end of a strip 10 the upper end of which is secured to the back of the dial by welding or other suitable means. This strip 10 has a section 11 which extends rearward and bridges the connection of the finger 7 with the arm 5 on the inner end of the pointer arbor 3. The pointer and its arbor are carried by the dial, and the finger, thermo-responsive ribbon and supporting strip are attached to the dial, thus these elements form a unitary structure.

The casing illustrated comprises a shallow cup 12 and a tubular stem 13 that projects from a hollow hub 14 which is attached to and opens into the casing. Preferably the lower end of the stem is open and for a short distance up from the lower end the stem is slitted, so as to allow for circulation of liquid into the stem and about the thermostatic ribbon.

In the open end of the cup over the dial is a glass 16 which is held in place by a bezel 17, a packing washer 15 being arranged between the glass and the dial.

The unitary active element and the casing are assembled by thrusting the strip and thermoresponsive ribbon through the opening in the peripheral wall of the cup from the interior outward. A screw 18 may be threaded through the back wall of the cup into the bridge section 11 of the strip 10 for holding the parts together. The tubular stem is attached to the hub 14 and the glass and bezel applied to the cup over the dial.

A culinary use for which this thermometer is particularly adapted is that of indicating the temperature of hot fat in which such foods as doughnuts, potatoes and etc. are fried. When used for such a purpose the thermometer is applied to the vessel containing the fat or to a basket or tray holding the food, with the tubular stem immersed in the fat, and the thermo-strip being exposed will quickly respond to the heat of the fat.

The thermo-strip is short and powerful, but very sensitive and although the movement of its free end is slight, as it is connected by a long non-thermal arm with the pointer near its pivot, a relatively extended movement over the dial indications is imparted to the free end of the pointer.

With the construction described the casing is small and comparatively thin. The parts of the active element are few and simple to make and put together. Only a small amount of the costly thermo-responsive metal is required and the active element can readily be assembled with a suitable case of any desired design.

The invention claimed is:—

1. A thermometer unit comprising a dial with temperature indicia, an arbor extending through and rotatably supported by the dial, a pointer attached to said arbor in front of the dial, an arm attached to said arbor in back of the dial, a strip with its upper end secured to the back of the dial, an end of a thermo-responsive ribbon secured to the lower end of said strip, a finger with one end attached to the free end of said ribbon, and means connecting the other end of said finger with said arm on the pointer arbor.

2. A thermometer unit comprising a dial with temperature indicia, an arbor extending through and rotatably supported by the dial, a pointer attached to said arbor in front of the dial, a slotted arm attached to said arbor in back of the dial, a strip with its upper end secured to the back of the dial, an end of a thermo-responsive ribbon secured to the lower end of said strip, a finger with one end attached to the free end of said ribbon and a pin at the other end of said finger and entering the slot in said arm on the pointer arbor.

3. A thermometer comprising a dial with temperature indicia, an arbor extending through and rotatably supported by the dial, a pointer attached to said arbor in front of the dial, an arm attached to said arbor in back of the dial, a strip with its upper end secured to the back of the dial, an end of a thermo-responsive ribbon secured to the lower end of said strip, a finger with one end attached to the free end of said ribbon, means connecting the other end of said finger with said arm on the pointer arbor, a casing enclosing said dial and pointer, and a tubular stem extending from said casing and protecting said thermo-responsive strip.

4. A thermometer comprising a dial with temperature indicia, an arbor extending through and rotatably supported by the dial, a pointer attached to said arbor in front of the dial, an arm attached to said arbor in back of the dial, a strip with its upper end secured to the back of the dial, an end of a thermo-responsive ribbon secured to the lower end of said strip, a finger with one end attached to the free end of said ribbon, means connecting the other end of said finger with said arm on the pointer arbor, a shallow cup encasing said dial and pointer, and a tubular stem extending from said cup and encasing said ribbon, said stem having open ends and slits extending upward from its outer end.

5. A thermometer unit comprising a dial with temperature indicia, an arbor rotatably supported by the dial, a pointer attached to said arbor and movable over said temperature indicia, a strip with one end secured to the back of the dial and extending radially beyond the periphery thereof, a short U-shaped thermo-responsive ribbon secured to the free end of said strip, a finger connected to said ribbon and extending parallel with said strip, and means connecting said finger with said pointer.

FREDERICK A. NODINE.